July 8, 1924.                                                  1,500,828
M. E. LAYNE
WELL SCREEN AND METHOD OF MAKING SAME
Filed April 19, 1923          2 Sheets-Sheet 1

Inventor
Mahlon E. Layne
By Lyon & Lyon attys.

July 8, 1924.
M. E. LAYNE
WELL SCREEN AND METHOD OF MAKING SAME
Filed April 19, 1923       2 Sheets-Sheet 2
1,500,828
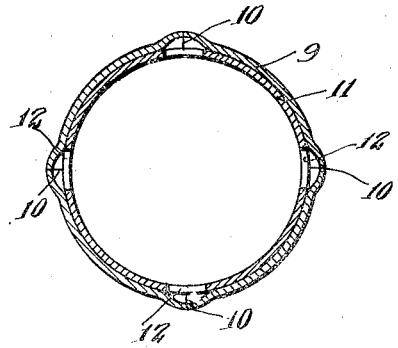
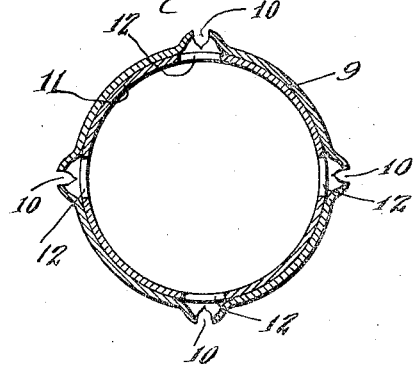
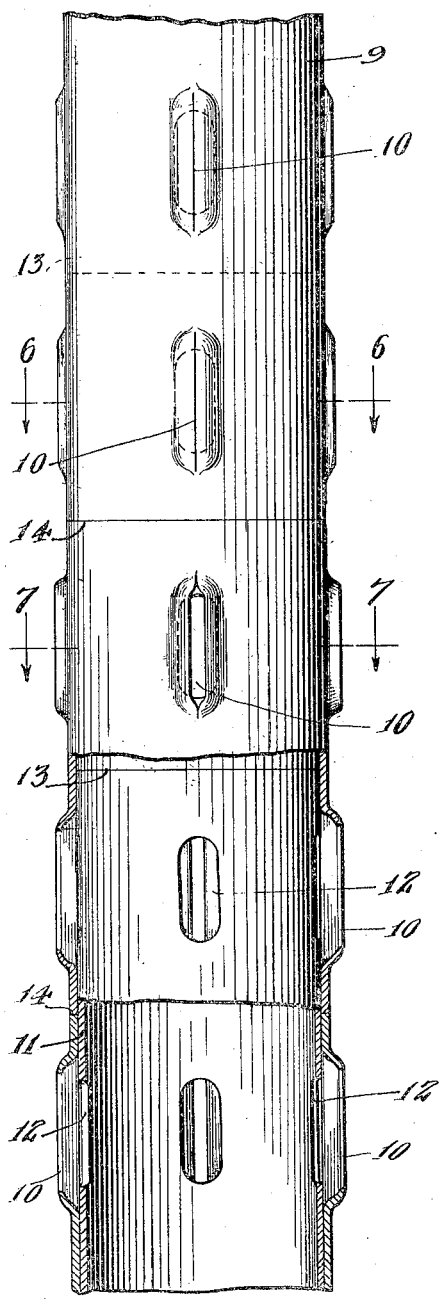
Inventor
Mahlon E. Layne
By Lyon & Lyon attys.

Patented July 8, 1924.

1,500,828

UNITED STATES PATENT OFFICE.

MAHLON E. LAYNE, OF HOUSTON, TEXAS.

WELL SCREEN AND METHOD OF MAKING SAME.

Application filed April 19, 1923. Serial No. 633,083.

*To all whom it may concern:*

Be it known that I, MAHLON E. LAYNE, a citizen of the United States, residing at Houston, in the county of Harris and State of Texas, have invented a new and useful Well Screen and Method of Making Same, of which the following is a specification.

This invention relates to well screens such as are usually employed for screening out sand or other solids from the liquid entering a well casing, and the invention includes also the method of making such a screen.

In screens of this general character it is desirable to preserve a smooth interior surface devoid of projections which would retard the upward flow of the liquid through the casing; it is also desirable that the screen, at least in its initial form should present a substantially smooth exterior surface, that is to say, free from projecting collars or couplings, so that it may readily be slid down or driven into the well bore without being obstructed in passing through hard formations. Further, it has been found that in sinking a well screen in which the screen perforations are open before setting, such perforations are quite apt to become so clogged during the sinking of the screen as to render the screen partly if not entirely inefficient for service.

The general object of the present invention is to provide a simple screen and method, which will operate to enable the screen to be readily sunk in the well, and which will prevent any possibility of the screen becoming clogged.

Further objects of the invention will appear hereinafter.

Various other objects and advantages will be more fully apparent from the following description of the accompanying drawings which form a part of this disclosure, and which illustrate a preferred embodiment of the invention.

In the drawings:

Fig. 5 is a side elevation and partial section illustrating a modified embodiment of the invention.

Fig. 6 is a section taken on the line 6—6 of Fig. 5 and illustrating the casing at a point where it has not been perforated.

Fig. 7 is a section on the line 7—7; this section illustrates the form of the casing after the operation of the casing tool.

Figure 1:
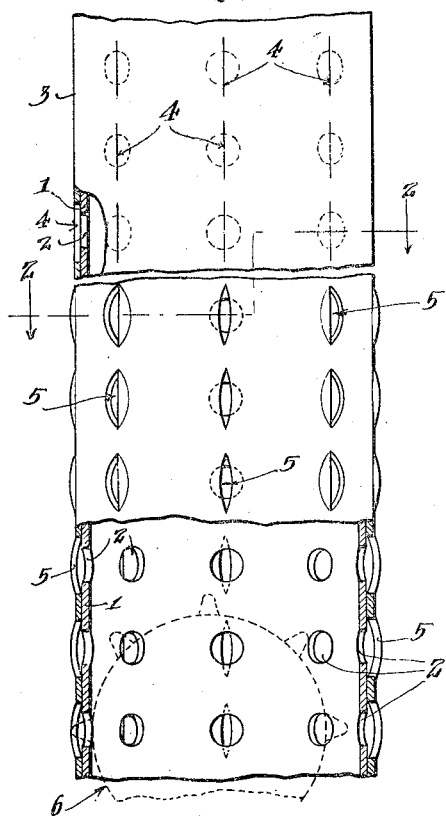
Figure 1 is an elevation, partly in section, of a screen embodying the present invention.
Figure 2:
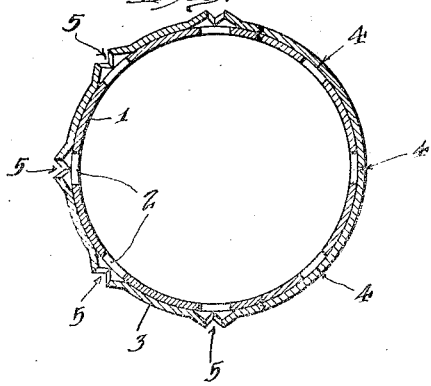
Fig. 2 is a section on line 2—2 of Fig. 1.

In Figures 1 and 2, the screen comprises an inner pipe or shell 1 having vertical rows of relatively spaced perforations 2, and an outer pipe or shell 3, which is slit at locations 4 corresponding to the spacing of the perforations in the inner pipe and is then fit closely over the inner pipe with the several slits extending across the companion perforations. Perforations on inner pipe may be round, square or oblong, preferably oblong more clearly shown in Figs. 5, 6 and 7. (See the upper portion of Figure 1).

The metal adjacent each slit 4 is then pressed outwardly to widen the slits to form openings 5 in the outer pipe communicating with the companion perforations in the inner pipe. This operation may be accomplished either before or after the screen is in position of use, by any suitable means, such for instance as a rotary toothed member 6 which is moved longitudinally in the screen with the teeth having a "rack and pinion" engagement with the perforations. In the drawings only the punching wheel alone is indicated in dotted lines, it being understood that a complete punch device will include a body and such other parts as are necessary.

One type of device suitable for this purpose is fully shown and described in my co-pending application, entitled, "Method and means for forming well-screens," Serial No. 633,084, filed April 19, 1923, and to which reference may be had for a more detailed description and illustration of the device of which the punch element shown herein, is a part.

It is the preferred practice to manufacture these screens in the form shown in the upper portion of Fig. 1 where heavy pipe is used with the slits 4 closed, and at the well site to drive the screen into the earth or sink it into a well bore to its position of use while in this closed condition. By positioning the screen all danger of clogging during installation is eliminated. After the screen is so positioned the slits 4 are widened to form the openings 5, as above explained.

From the above, it will be evident that the perforations not only serve to admit liquid into the screen, but also serve as a mechanical means of controlling the action of the device which is utilized to widen the slits. It will also be evident that without such provisions for control a widening of the slits by mechanical means operated from the surface would be difficult especially in cases where the screen is positioned at relatively great depth.

Figure 3:
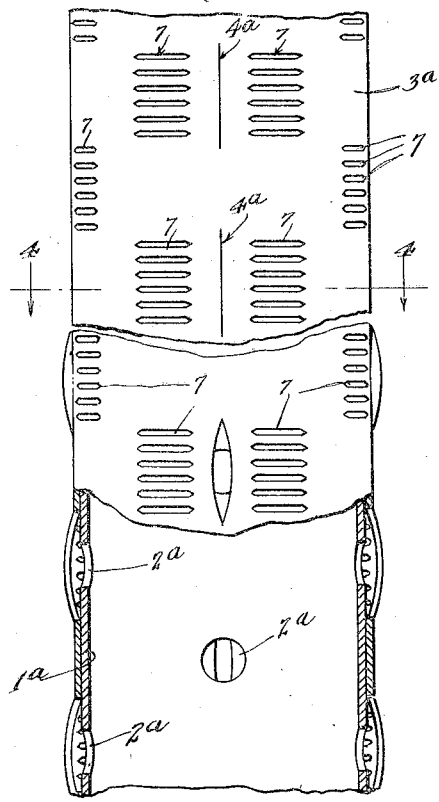
Fig. 3 is an elevation, partly in section, of a modified form of screen.
Figure 4:
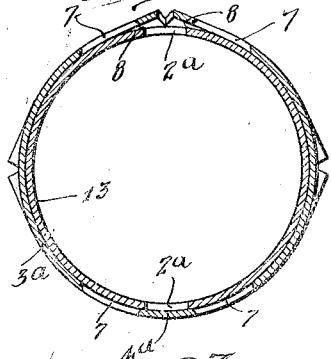
Fig. 4 is a section on line 4—4 of Fig. 3.

The type of screen illustrated in Figs. 3 and 4, is of the same general form as that illustrated in Figures 1 and 2, and includes the inner shell 13 having perforations 2ª, and the outer shell 3ª having slits 4ª all located in the same relative positions and serving the same purposes as the like elements in the previously described screen. In addition, this modified form of screen is provided with transverse slots 7 on opposite sides of each slit 4ª, such slots being closed by the wall of the inner shell before the slits 4ª are widened by the pressing outwardly of the adjacent metal. With reference to Fig. 4 it will be observed that when the slits are so widened, the slots 7 will be opened to the space 8 between the two shells so that they communicate by a tortuous path, with the companion perforations.

With this form of screen there will be little tendency for sand to become lodged in the spaces 8 because the sand entering said spaces will find an easy outlet through the slots 7; the slots also provide for a greater flow of liquid to the perforations.

Of course it will be obvious that in case it is desirable to completely form either of these screens prior to insertion thereof into a well, the operation of widening the slits may be performed at the time of manufacture or at the well site.

Referring to Figs. 5-7 inclusive, the preferred form of well screen is illustrated which facilitates the operation of the perforating tool. The well screen includes an outer shell 9 having longitudinal slits 10 located at different levels, and disposed equidistant around the periphery of the shell. At the point where the slits are formed, the adjacent metal is bulged outwardly to produce an elongated hump or "blister" on the shell. The metal of course draws somewhat in this operation which provides a bridge effect at the point of opening, greatly adding to the strength of the screen at perforated portions. The convexity on the outer sides of the bulges or blisters gives them considerable resistance to any forces acting on the outside of the pipe.

In this embodiment of the invention an inner shell 11 is provided telescoped within the outer shell, and this shell is provided with elongated pilot openings 12 for guiding the perforating wheel.

The pipe may be constructed of short sections or sleeves the butting lines 13 of the inner sleeve being staggered between the butting lines 14 of the outer shell.

The upper part of Figure 5 shows the bulges or blisters before being broken out, but the lower part represents them broken out so that relatively large openings are formed through the pipe.

While the screens as herein illustrated and described are well adapted to fulfill the objects primarily stated, it is to be understood that the invention in its broadest aspect is intended to include such modifications and changes as come within the scope of the claims which follow.

I claim:

1. A well screen comprising an inner pipe having a plurality of perforations in its walls, and an outer pipe having a slit extending across each perforation with the wall of the outer pipe adjacent each slit pressed outwardly to widen the slits and form openings in the outer pipe communicating with the perforations in the inner pipe.

2. A well screen comprising an inner pipe having a plurality of longitudinal rows of perforations, and an outer pipe having a plurality of slits each extending across one of the perforations with the wall of the outer pipe adjacent each slit pressed outwardly to widen the slits and form openings in the outer pipe communicating with the perforations in the inner pipe.

3. A well screen comprising an inner pipe having a plurality of longitudinal rows of perforations in its walls, and an outer pipe having corresponding rows of longitudinal slits each extending across a companion perforation with the wall of the outer pipe adjacent each slit pressed outwardly to widen the slits and form openings in the outer pipe communicating with the perforations in the inner pipe.

4. A well screen comprising an inner pipe having a plurality of perforations in its walls, and an outer pipe in close contact with the inner pipe and having a plurality of slits each extending across one of the perforations and relatively transverse slots adjacent each slit, the wall adjacent the several slits being pressed outwardly to widen the slits and form openings in the outer pipe communicating with the perforations in the inner pipe, and to open the adjacent slots.

5. A well screen comprising an inner pipe having a plurality of perforations in its walls, and an outer pipe in close contact with the inner pipe and having a plurality of slits each extending across one of the perforations and apertures adjacent each of the slits and out of registry with said perforations, the wall of the outer pipe adjacent the several slits being pressed outwardly to widen the slits and form openings in the outer pipe communicating with the perforations in the inner pipe, and to open the adjacent apertures.

6. An article of manufacture comprising an inner pipe having perforations, and an outer pipe in close contact with the inner pipe and having a slit extending across each perforation and apertures adjacent each of the slits closed by the wall of the inner pipe, the perforations permitting a subsequent pressing outwardly of the wall of the outer pipe adjacent each of the slits to widen the slits to form openings in the outer pipe and to open the adjacent apertures therein.

7. An article of manufacture comprising an inner pipe having perforations, and an outer pipe in close contact with the inner pipe and having a slit extending across each perforation and relatively transverse slots adjacent each slit closed by the wall of the inner pipe, the perforations permitting a subsequent pressing outwardly of the wall of the outer pipe adjacent each of the slits to widen the slits to form openings in the outer pipe and to open the adjacent slots therein.

8. An article of manufacture comprising an inner pipe having a plurality of longitudinal rows of perforations, and an outer pipe in close contact with the inner pipe and having corresponding rows of longitudinal slits each extending across a companion perforation, the perforations permitting a subsequent pressing outwardly of the metal adjacent the slits to widen the slits to form openings in the outer pipe communicating with the perforations in the inner pipe.

9. An article of manufacture comprising an inner pipe having a plurality of longitudinal rows of perforations, and an outer pipe in close contact with the inner pipe and having a plurality of rows of slits each extending across one of the perforations, the perforations permitting a subsequent pressing outwardly of the metal adjacent the slits to widen the slits to form openings in the outer pipe communicating with the perforations in the inner pipe.

10. An article of manufacture comprising an inner pipe having perforations, and an outer pipe in close contact with the inner pipe and having a slit extending across each perforation, the perforations permitting a subsequent pressing outwardly of the metal adjacent the several slits to widen the slits to form openings in the outer pipe communicating with the perforations in the inner pipe.

11. In a method of making a well screen comprising an inner and an outer pipe adapted to fit closely one over the other, the steps consisting of forming a plurality of relatively spaced perforations in the inner pipe, forming slits in the outer pipe at locations corresponding to the relative spacing of the perforations in the inner pipe, fitting the outer pipe over the inner pipe with the several slits in the outer pipe extending across the companion perforations in the inner pipe, and subsequently widening the slits to form openings communicating with the perforation.

12. In a method of making a well screen comprising an inner and an outer pipe adapted to fit closely one over the other, the steps consisting of forming a plurality of longitudinal rows of relatively spaced perforations in the inner pipe, forming slits in the outer pipe at locations corresponding to the spacing of the perforations in the inner pipe, fitting the outer pipe over the inner pipe with the several slits in the outer pipe extending across the companion perforations in the inner pipe, and subsequently widening the slits to form openings communicating with the perforations.

13. In a method of making a well screen comprising an inner and an outer pipe adapted to fit closely one over the other, the steps consisting of forming a plurality of relatively spaced perforations in the inner pipe, forming slits in the outer pipe at locations corresponding to the relative spacing of the perforations in the inner pipe, forming apertures in the outer pipe adjacent each slit, fitting the outer pipe over the inner pipe with the several slits in the inner pipe extending across the companion perforations in the outer pipe and with the adjacent apertures closed by the wall of the outer pipe, and subsequently forcing outwardly the wall of the outer pipe adjacent each slit to widen the slits to form openings communicating with the perforations and to open the apertures.

14. In a method of making a well screen comprising an inner and an outer pipe adapted to fit closely one over the other, the steps consisting of forming a plurality of relatively spaced perforations in the inner pipe, forming slits in the outer casing at locations corresponding to the relative spacing of the perforations in the inner pipe, forming transverse slots in the outer pipe adjacent each slit, fitting the outer pipe over the inner pipe with the several slits extending across the companion perforations in the inner pipe and with the adjacent slots closed by the wall of the outer pipe, and subsequently forcing outwardly the wall of the outer pipe adjacent each slit to widen the slits to form openings communicating with the perforations and to open the slots.

15. In a method of making a well screen comprising an inner and an outer pipe adapted to fit closely one over the other, the steps consisting of forming a plurality of relatively spaced perforations in the inner pipe, forming slits in the outer pipe at locations corresponding to the spacing of the perforations in the inner pipe, fitting the outer pipe over the inner pipe with the several slits extending across the companion perforations in the inner pipe, lowering the screen into the earth to position of use, and subsequently widening the slits by mechanical means controlled in its operation by engagement with the perforations.

Signed at South Pasadena, Cal., this 12th day of April, 1923.

MAHLON E. LAYNE.